United States Patent
Zhang et al.

(10) Patent No.: US 11,085,123 B2
(45) Date of Patent: Aug. 10, 2021

(54) ANODE, PREPARATION METHOD AND USE THEREOF, OZONE GENERATING SYSTEM, AND DENTAL SCALER

(71) Applicant: Nicefeel Medical Device Technology Co., Ltd, Shenzhen (CN)

(72) Inventors: Qing Zhang, Shenzhen (CN); Xiaowen Liu, Shenzhen (CN); Gang Wang, Shenzhen (CN); Xinquan Liu, Shenzhen (CN); Jinfeng Li, Shenzhen (CN); Gang Zhou, Shenzhen (CN)

(73) Assignee: NICEFEEL MEDICAL DEVICE TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 16/726,422

(22) Filed: Dec. 24, 2019

(65) Prior Publication Data

US 2021/0040628 A1 Feb. 11, 2021

(30) Foreign Application Priority Data

Aug. 7, 2019 (CN) .......................... 201910726184.2

(51) Int. Cl.
| | | |
|---|---|---|
| *C25B 11/093* | (2021.01) | |
| *C25B 11/057* | (2021.01) | |
| *C25B 11/051* | (2021.01) | |
| *C25B 1/04* | (2021.01) | |
| *C25B 1/13* | (2006.01) | |

(52) U.S. Cl.
CPC .............. *C25B 11/093* (2021.01); *C25B 1/04* (2013.01); *C25B 1/13* (2013.01); *C25B 11/051* (2021.01); *C25B 11/057* (2021.01)

(58) Field of Classification Search
CPC .............. C25B 11/0484; C25B 11/0405; C25B 11/0415; C25B 1/04; C25B 1/13; C25B 11/051; C25B 11/057; C25B 11/093; A61C 17/02; C02F 2201/782; C02F 2103/026; C02F 2001/46138; C02F 1/4672; C02F 1/46109
See application file for complete search history.

(56) References Cited

U.S. PATENT DOCUMENTS

| | | | |
|---|---|---|---|
| 7,378,005 B2 * | 5/2008 | Kaneda | H01M 4/8828 204/290.13 |
| 9,677,183 B2 * | 6/2017 | Kintrup | B01J 23/462 |
| 2016/0228690 A1 * | 8/2016 | Fregoso | A61N 1/0448 |
| 2017/0247269 A1 * | 8/2017 | Tan | C22C 13/02 |

FOREIGN PATENT DOCUMENTS

| | | | |
|---|---|---|---|
| CN | 1751140 A | 3/2006 | |
| CN | 101608317 A | 12/2009 | |
| CN | 105002517 A | 10/2015 | |
| CN | 108456894 A | 8/2018 | |
| CN | 108754533 A | 11/2018 | |
| CN | 109602512 A | 4/2019 | |
| CN | 110055548 A | 7/2019 | |
| CN | 110408949 A | 11/2019 | |
| TW | 200932956 A | 8/2009 | |
| WO | WO-2004072329 A1 * | 8/2004 | .............. C25B 1/13 |

* cited by examiner

*Primary Examiner* — Alexander W Keeling
*Assistant Examiner* — Mofoluwaso S Jebutu
(74) *Attorney, Agent, or Firm* — Dorsey & Whitney LLP

(57) ABSTRACT

An anode for generating ozone by electrolysis of water, a preparation method and use thereof, an ozone generating system, and a dental scaler are provided. The anode includes a titanium substrate and a composite oxide layer attached to a surface of the titanium substrate. The composite oxide layer is made of a metal oxide. Metal elements in the metal oxide comprise tin, ruthenium, manganese, titanium, and nickel, and a molar ratio of tin, ruthenium, manganese, titanium, and nickel is (200-500):(2.5-20):1:(1.5-7):(5-15).

13 Claims, No Drawings

ANODE, PREPARATION METHOD AND USE THEREOF, OZONE GENERATING SYSTEM, AND DENTAL SCALER

CROSS REFERENCES TO RELATED APPLICATION

This application claims priority to Chinese Patent Application No. 2019107261842, entitled "ANODE, PREPARATION METHOD AND USE THEREOF, OZONE GENERATING SYSTEM, AND DENTAL SCALER" filed on Aug. 7, 2019, the entire content of which is incorporated herein, in its entirety, by this reference.

TECHNICAL FIELD

The present disclosure relates to the technical field of ozone generation, in particular to an anode for generating ozone by electrolysis of water, a preparation method and use thereof, an ozone generating system, and a dental scaler.

BACKGROUND

The ozone water is used for rinsing teeth or performing oral care, which can quickly and effectively kill bacteria such as tubercle *bacillus*, colon *bacillus*, gonococcus, and typhoid *bacillus* and harmful microorganisms in teeth and oral cavity. The technology for electrolyzing water to produce ozone has the advantages of low voltage, no harmful by-products and the like, and the principle is that water is electrolyzed by using direct current voltage to generate ozone at an anode. However, this method has a disadvantage in that it is difficult to controllably generate ozone with an appropriate amount, and a stable sterilizing effect cannot be maintained when the ozone water generated by this technique is used to rinse teeth.

SUMMARY

Accordingly, it is necessary to provide an anode for generating ozone by electrolysis of water, which is capable of stably generating ozone with an appropriate amount.

An anode for generating ozone by electrolysis of water is provided, which includes a titanium substrate and a composite oxide layer attached to a surface of the titanium substrate. The composite oxide layer is made of a metal oxide. Metal elements in the metal oxide include tin, ruthenium, manganese, titanium, and nickel, and a molar ratio of tin, ruthenium, manganese, titanium, and nickel is (200-500):(2.5-20): 1:(1.5-7):(5-15).

In one of the embodiments, the molar ratio of tin, ruthenium, manganese, titanium, and nickel is (300-400):(5-15):1:(3-5):(8-12).

A method of preparing an anode for generating ozone by electrolysis of water is provided, which includes: obtaining a mixed solution containing a tin precursor, a ruthenium precursor, a manganese precursor, a titanium precursor, and a nickel precursor, wherein a molar ratio of the tin precursor, the ruthenium precursor, the manganese precursor, the titanium precursor, and the nickel precursor by metal elements is (200-500):(2.5-20): 1:(1.5-7):(5-15); and coating the mixed solution on a titanium substrate, and then calcinating to obtain the anode.

In one of the embodiments, prior to coating the mixed solution on the titanium substrate, the method further includes pretreating the titanium substrate and then etching the titanium substrate in an etching solution.

In one of the embodiments, the pretreatment is sandblasting.

In one of the embodiments, the etching solution is at least one selected from an oxalic acid solution and a hydrochloric acid solution.

In one of the embodiments, the etching is performed for 20 min to 40 min at a temperature of 70° C. to 90° C.

In one of the embodiments, a molar ratio of the tin precursor, the ruthenium precursor, the manganese precursor, the titanium precursor, and the nickel precursor by metal elements is (200-500):(2.5-20): 1:(1.5-7):(5-15).

In one of the embodiments, after coating the mixed solution on a titanium substrate, the method includes drying the mixed solution for 5 min to 10 min at a temperature of 90° C. to 130° C.

In one of the embodiments, the calcinating is performed for 1 h to 3 h at a temperature of 380° C. to 600° C.

In one of the embodiments, the step of coating the mixed solution on the titanium substrate and then calcinating is repeated for 3 to 5 times.

A process of generating ozone by electrolysis of water using the aforementioned anode is further provided.

In one of the embodiments, conditions of the process of generating ozone by electrolysis of water include: voltage is less than or equal to 24 V, and constant current density is less than or equal to 20 $mA/cm^2$.

An ozone generating system including the aforementioned anode is further provided.

A dental scaler including the aforementioned ozone generating system is further provided.

The above and other features of the present disclosure including various novel details of construction and combinations of parts, and other advantages, will now be more particularly pointed out in the claims.

DETAILED DESCRIPTION OF THE EMBODIMENTS

The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Unless otherwise defined, all terms (including technical and scientific terms) used herein have the same meaning as commonly understood by one of ordinary skill in the art to which this invention belongs. The terms used herein is for the purpose of describing particular embodiments only and is not intended to limit the present disclosure. As used herein, the term "and/or" includes any and all combinations of one or more of the associated listed items.

An anode for generating ozone by electrolysis of water in accordance with an embodiment includes a titanium substrate and a composite oxide layer attached to a surface of the titanium substrate.

The titanium substrate may be a titanium-based material of any shape, such as a titanium plate or a titanium rod. The titanium substrate may be made of a titanium alloy having a titanium content of 98% or more.

The titanium substrate may have at least one surface, and the composite oxide layer may be attached to one surface of the titanium substrate or may be attached to a plurality of surfaces of the titanium substrate. The composite oxide layer is made of a metal oxide, metal elements in the metal oxide include tin, ruthenium, manganese, titanium, and nickel, that is, the material of the composite oxide layer includes tin oxide, ruthenium oxide, manganese oxide, titanium oxide, and nickel oxide. A molar ratio of tin, ruthenium, manganese, titanium, and nickel is (200-500):(2.5-20): 1:(1.5-7):(5-15). In one embodiment, the molar ratio of tin, ruthenium, manganese, titanium, and nickel is (300-400):(5-15): 1:(3-5):(8-12).

The aforementioned anode has a special composite oxide layer, and ozone water with an ozone concentration of 0.1 mg/L to 0.6 mg/L can be stably produced when the anode is used in the process of generating ozone by electrolysis of water.

A method of preparing the aforementioned anode in accordance with an embodiment includes the following steps:

A titanium substrate is pretreated to obtain a pretreated titanium substrate.

The pretreatment may be sandblasting. The roughness of the surface of the titanium substrate can be increased through sandblasting treatment, which is beneficial to improve the adhesion of the composite oxide layer on the surface of the titanium substrate. The blasting material used for the sandblasting treatment may be, for example, silicon carbide or quartz sand.

The pretreated titanium substrate is etched in an etching solution to obtain an etched titanium substrate.

The etching solution may be at least one of an oxalic acid solution and a hydrochloric acid solution. In addition, the oxalic acid solution may have a concentration of 20% to 50% by weight, and the hydrochloric acid solution may have a concentration of 10% to 30% by weight. The etching may be performed for 20 min to 40 min at a temperature of 70° C. to 90° C. The adhesion of the composite oxide layer on the surface of the titanium substrate is further improved by etching. After etching, the etching solution remained on the surface of the titanium substrate can be rinsed with pure water to obtain the etched titanium substrate.

A mixed solution containing a tin precursor, a ruthenium precursor, a manganese precursor, a titanium precursor, and a nickel precursor is obtained.

A molar ratio of the tin precursor, the ruthenium precursor, the manganese precursor, the titanium precursor, and the nickel precursor by metal elements is (200-500):(2.5-20): 1:(1.5-7):(5-15). In one embodiment, the molar ratio is (300-400):(5-15): 1:(3-5):(8-12).

The tin precursor is a compound containing tin, and may for example be at least one of tin chloride and tin oxalate. The ruthenium precursor is a compound containing ruthenium, and may be, for example, ruthenium chloride. The manganese precursor is a compound containing manganese, and may be, for example, manganese chloride. The titanium precursor is a compound containing titanium, and may be, for example, butyl titanate. The nickel precursor is a compound containing nickel, and may for example be at least one of nickel chloride and nickel acetate.

The mixed solution can be obtained by dissolving the tin precursor, the ruthenium precursor, the manganese precursor, the titanium precursor, and the nickel precursor in a solvent according to the aforementioned ratio. The solvent may be, for example, at least one selected from the group consisting of ethanol, isopropanol, and n-butanol. The amount of solvent may be adjusted within a wide range, for example, a ratio of the total weight of the ruthenium precursor, the manganese precursor, the titanium precursor, the nickel precursor, and the tin precursor to the weight of the solvent may be 1:(5-20).

The mixed solution is coated on the etched titanium substrate and dried, and then is calcinated to obtain the anode for generating ozone by electrolysis of water.

The drying may be performed for 5 min to 10 min at a temperature of 90° C. to 130° C. The calcinating is performed for 1 h to 3 h at a temperature of 380° C. to 600° C.

In addition, the step of coating the mixed solution on the etched titanium substrate, drying, and then calcinating may be repeated for 3 to 5 times, which is beneficial to increase the deposition amount of the metal oxide on the surface of the titanium substrate. In this case, the temperature of the last calcinating may be higher than the temperatures of the previous calcinatings, for example, when the step is repeated 5 times, the temperature of the first four calcinatings may be 380° C. to 450° C., and the temperature of the fifth calcinating may be 500° C. to 600° C.

The aforementioned anode can be used in the process of generating ozone by electrolysis of water, in particular to the process of generating ozone by electrolysis of water under a low pressure. In one embodiment, conditions of the process of generating ozone by electrolysis of water include: voltage is less than or equal to 24 V, and constant current density is less than or equal to 20 mA/cm$^2$. In addition, the voltage may be 12 V to 24 V, and the constant current density may be 5 mA/cm$^2$ to 20 mA/cm$^2$.

The aforementioned anode is particularly suitable for preparing an ozone generating system in a dental scaler, ozone water with proper and stable ozone concentration can be produced at any time and any place under the conditions of supplying water and providing a direct current power supply and constant current, and safe ozone water production can be achieved at any water flow. The ozone generating system prepared by using the aforementioned anode can be used in any dental scaler on the market, and has the remarkable advantages of long service life, low cost, no pollution, simple manufacture, convenience in carrying and the like.

A dental scaler in accordance with an embodiment includes an ozone generating system, which includes the aforementioned anode. In addition, the ozone generating system also includes conventional structures in the art, such as a cathode, a container containing the anode and the cathode, a power supply unit, and the like. The cathode and the anode can be oppositely arranged, and in order to achieve a better effect of generating ozone by electrolysis of water, a vertical distance between the cathode and the anode is not more than 5 mm. The ozone generating system can be used as an independent component or a standard part, and can be located between a water tank and a water pump of the dental scaler, or between the water pump and a nozzle, or inside the nozzle component. When the ozone generating system is electrically coupled to a constant current power supply, ozone water with the ozone concentration of 0.1 mg/L to 0.6 mg/L can be stably produced at the anode along with the rapid passing of water with a certain flow through the ozone generating system. The ozone water can clean the gum of teeth in all directions, which can not only achieve the purpose of rapid cleaning, but also directly perform sterilization and disinfecting to remove halitosis, thereby achieving double effects of purifying oral cavity and protecting gum health. The aforementioned dental scaler has no toxic substance residue and no additive during use, is safe to use, and is an environmentally friendly and healthy low-cost product.

The following examples further illustrate the present disclosure, but are not intended to limit the present disclosure.

The titanium substrate used in the examples is titanium plate TA1, and other reagents are all commercially available products.

Example 1

A titanium plate was subjected to sandblasting treatment, then was placed in an oxalic acid solution with a concentration of 20% by weight to be etched for 30 min at a temperature of 80° C., and was taken out and rinsed with pure water. Tin chloride, ruthenium chloride, manganese chloride, butyl titanate, and nickel chloride were dissolved in ethanol to obtain a mixed solution, in which Sn:Ru:Mn:Ti:Ni (molar ratio)=320:12:1:4:10, and a ratio of the total weight of tin chloride, ruthenium chloride, manganese chloride, butyl titanate, and nickel chloride to the weight of ethanol was 1:5. The mixed solution was coated on a surface of the titanium plate, dried for 10 min at a temperature of 120° C., and then calcinated for 1 h at a temperature of 450° C. The coating was repeated again, and dried and calcinated 4 times under the above conditions. The calcinating temperature was increased to 600° C. and the calcinating was carried out for 3 hours for the last time, to obtain the anode prepared in this example.

Example 2

The steps of preparing the anode of this example were substantially the same as those in example 1, except that in the mixed solution, Sn:Ru:Mn:Ti:Ni (molar ratio)=400:15:1:5:12.

Example 3

The steps of preparing the anode of this example were substantially the same as those in example 1, except that in the mixed solution, Sn:Ru:Mn:Ti:Ni (molar ratio)=300:5:1:3:8.

Example 4

The steps of preparing the anode of this example were substantially the same as those in example 1, except that in the mixed solution, Sn:Ru:Mn:Ti:Ni (molar ratio)=200:2.5:1:1.5:5.

Example 5

The steps of preparing the anode of this example were substantially the same as those in example 1, except that in the mixed solution, Sn:Ru:Mn:Ti:Ni (molar ratio)=500:20:1:7:15.

Comparative Example 1

The steps of preparing the anode of this comparative example were substantially the same as those in example 1, except that the mixed solution contained no butyl titanate, Sn:Ru:Mn:Ni (molar ratio)=500:20:1:15.

Test Example

The anodes prepared in examples 1 to 5 and comparative example 1 were assembled into an ozone generating system and tested for ozone generation.

The anode and the cathode were placed in a container with a distance of 2 mm between the anode and the cathode. The container had a water inlet and a water outlet, and was electrically coupled a constant current power supply. The upper limit voltage was 20V and the constant current density was 15 mA/cm$^2$. Tap water was injected from the water inlet at a flow rate of 15 L/hr, and the real-time concentration of ozone water was tested at the water outlet. The ozone concentration was recorded every 0.5 h and listed in table 1.

TABLE 1

| | Ozone concentration, mg/L | | | | | | | |
|---|---|---|---|---|---|---|---|---|
| | 0.5 h | 1 h | 1.5 h | 2 h | 2.5 h | 3 h | 3.5 h | 4 h |
| Example 1 | 0.48 | 0.48 | 0.48 | 0.48 | 0.48 | 0.48 | 0.48 | 0.48 |
| Example 2 | 0.36 | 0.36 | 0.36 | 0.36 | 0.36 | 0.36 | 0.36 | 0.36 |
| Example 3 | 0.29 | 0.29 | 0.29 | 0.29 | 0.29 | 0.29 | 0.29 | 0.29 |
| Example 4 | 0.59 | 0.60 | 0.60 | 0.58 | 0.60 | 0.60 | 0.58 | 0.59 |
| Example 5 | 0.17 | 0.19 | 0.18 | 0.18 | 0.17 | 0.18 | 0.19 | 0.18 |
| Comparative Example 1 | 0.08 | 0.05 | 0.01 | 0.12 | 0.06 | 0.07 | 0.02 | 0.01 |

It can be seen from Table 1 that ozone water with the ozone concentration of 0.1 mg/L to 0.6 mg/L can be stably produced when the anode of the present disclosure is used in the process of generating ozone by electrolysis of water.

Although the respective exemplary embodiments have been described one by one, it shall be appreciated that the respective exemplary embodiments will not be isolated. Those skilled in the art can apparently appreciate upon reading the disclosure of this application that the respective technical features involved in the respective exemplary embodiments can be combined arbitrarily between the respective exemplary embodiments as long as they have no collision with each other. Of course, the respective technical features mentioned in the same exemplary embodiment can also be combined arbitrarily as long as they have no collision with each other.

The foregoing descriptions are merely specific exemplary embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure. Therefore, the protection scope of the present disclosure shall be subject to the protection scope of the appended claims.

What is claimed is:
1. An anode for generating ozone by electrolysis of water, the anode comprising:
   a titanium substrate including a surface; and
   a composite oxide layer attached to the surface of the titanium substrate;

wherein the composite oxide layer is made of a metal oxide;

wherein the metal oxide includes metal elements consisting of tin, ruthenium, manganese, titanium, and nickel; and wherein a molar ratio of the tin, ruthenium, manganese, titanium, and nickel in the metal oxide is (200-500): (2.5-20): 1:(1.5-7):(5-15), respectively.

2. The anode of claim 1, wherein the molar ratio of the tin, ruthenium, manganese, titanium, and nickel is (300-400): (5-15): 1:(3-5):(8-12), respectively.

3. A method of preparing an anode for generating ozone by electrolysis of water, the method comprising:

obtaining a mixed solution consisting of a tin precursor, a ruthenium precursor, a manganese precursor, a titanium precursor, and a nickel precursor, wherein a molar ratio of the tin precursor, the ruthenium precursor, the manganese precursor, the titanium precursor, and the nickel precursor by metal elements is (200-500):(2.5-20): 1:(1.5-7):(5-15), respectively;

coating the mixed solution on a titanium substrate to form a coated substrate; and calcinating the titanium substrate coated with the mixed solution to obtain the anode.

4. The method of claim 3, further comprising:

wherein prior to coating the mixed solution on the titanium substrate, pretreating the titanium substrate and then etching the titanium substrate so pretreated in an etching solution.

5. The method of claim 4, wherein the pretreatment includes sandblasting.

6. The method of claim 4, wherein the etching solution includes at least one of an oxalic acid solution or a hydrochloric acid solution.

7. The method of claim 4, wherein the etching is performed for 20 min to 40 min at a temperature of 70° C. to 90° C.

8. The method of claim 3, wherein after coating the mixed solution on the titanium substrate, the method comprises drying the mixed solution for 5 min to 10 min at a temperature of 90° C. to 130° C.

9. The method of claim 3, wherein the calcinating is performed for 1 h to 3 h at a temperature of 380° C. to 600° C.

10. The method of claim 3, wherein the step of coating the mixed solution on the titanium substrate and then calcinating is repeated for 3 to 5 times.

11. A process of generating ozone by electrolysis of water using an anode, wherein the anode includes a titanium substrate including a surface; and a composite oxide layer attached to the surface of the titanium substrate; wherein the composite oxide layer is made of a metal oxide; wherein the metal oxide includes metal elements consisting of tin, ruthenium, manganese, titanium, and nickel; and wherein a molar ratio of tin, ruthenium, manganese, titanium, and nickel in the metal oxide is (200-500):(2.5-20): 1:(1.5-7):(5-15), respectively, the process comprising:

generating ozone by electrolysis of water using the anode under conditions that comprise: a voltage of less than or equal to 24 V, and constant current density of less than or equal to 20 $mA/cm^2$.

12. An ozone generating system, comprising the anode of claim 1.

13. A dental scaler, comprising the ozone generating system of claim 12.

* * * * *